(12) United States Patent
Deng et al.

(10) Patent No.: US 12,025,885 B2
(45) Date of Patent: Jul. 2, 2024

(54) DISPLAY PANEL AND MANUFACTURING METHOD THEREOF, AND DISPLAY DEVICE

(71) Applicant: WUHAN CHINA STAR OPTOELECTRONICS TECHNOLOGY CO., LTD., Hubei (CN)

(72) Inventors: Qian Deng, Hubei (CN); Wei Cheng, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 276 days.

(21) Appl. No.: 17/597,295

(22) PCT Filed: Dec. 15, 2021

(86) PCT No.: PCT/CN2021/138371
§ 371 (c)(1),
(2) Date: Dec. 30, 2021

(87) PCT Pub. No.: WO2023/097789
PCT Pub. Date: Jun. 8, 2023

(65) Prior Publication Data
US 2023/0176425 A1    Jun. 8, 2023

(30) Foreign Application Priority Data
Dec. 3, 2021   (CN) .......................... 202111466592.2

(51) Int. Cl.
*G02F 1/1339*   (2006.01)
*G02F 1/1334*   (2006.01)
(Continued)

(52) U.S. Cl.
CPC .......... *G02F 1/1339* (2013.01); *G02F 1/1334* (2013.01); *G02F 1/133512* (2013.01); *G02F 1/134309* (2013.01); *G02F 1/13439* (2013.01)

(58) Field of Classification Search
CPC ................. G02F 1/1339; G02F 1/1334; G02F 1/133512; G02F 1/134309; G02F 1/13439
See application file for complete search history.

(56) References Cited

U.S. PATENT DOCUMENTS

| | | | |
|---|---|---|---|
| 2003/0081155 A1 | 5/2003 | Moon et al. | |
| 2015/0085226 A1 | 3/2015 | Yang et al. | |
| 2017/0082887 A1* | 3/2017 | Kubota | ............. G02F 1/133345 |

FOREIGN PATENT DOCUMENTS

| | | |
|---|---|---|
| CN | 102308252 A | 1/2012 |
| CN | 102736323 A | 10/2012 |

(Continued)

OTHER PUBLICATIONS

International Search Report Written Opinion issued in the corresponding PCT application No. PCT/CN2021/138371, dated Sep. 2, 2022, 21 pages with translation.

(Continued)

*Primary Examiner* — Lucy P Chien
(74) *Attorney, Agent, or Firm* — HSML P.C.

(57) ABSTRACT

This application discloses a display panel and a manufacturing method thereof, and a display device. A light-adjusting liquid crystal cell of the display panel includes a first substrate, a second substrate, a light-adjusting liquid crystal layer and a sealing layer. The ultraviolet light transmittance of the first substrate in a display area is less than a predetermined threshold, and the ultraviolet light transmittance of the second substrate in the display area is greater than or equal to the predetermined threshold. During the curing of frame glue, it can prevent pre-polymerized molecules from being exposed to light in advance. During the curing of the (Continued)

pre-polymerized molecules, it can make the pre-polymerized molecules have a cross-linking reaction to form a polymer network.

20 Claims, 8 Drawing Sheets

(51) Int. Cl.
*G02F 1/1335* (2006.01)
*G02F 1/1343* (2006.01)

(56) References Cited

FOREIGN PATENT DOCUMENTS

| | | | |
|---|---|---|---|
| CN | 102967966 | A | 3/2013 |
| CN | 106019681 | A | 10/2016 |
| CN | 106444169 | A | 2/2017 |
| CN | 107706313 | A | 2/2018 |
| CN | 110196508 | A | 9/2019 |
| CN | 113552741 | A | 10/2021 |
| JP | 02-308221 | A | 12/1990 |
| JP | 2000-122085 | A | 4/2000 |
| JP | 2002-098976 | A | 4/2002 |
| JP | 2008-020537 | A | 1/2008 |

OTHER PUBLICATIONS

Chinese Office Action, issued in corresponding Chinese Patent Application No. 202111466592.2, dated Dec. 5, 2022, 26 pages with translation.

* cited by examiner

DISPLAY PANEL AND MANUFACTURING METHOD THEREOF, AND DISPLAY DEVICE

FIELD OF THE DISCLOSURE

The present invention relates to display technologies, and more particularly to a display panel, a manufacturing method thereof, and a display device.

DESCRIPTION OF RELATED ARTS

A light-adjusting liquid crystal cell added at a side of an ordinary liquid crystal display cell and used to control viewing angle can make a display panel freely switch between a privacy mode with narrow viewing angle and a sharing mode with wide viewing angle.

Polymer liquid crystals in the light-adjusting liquid crystal cell are usually prepared by liquid crystal dripping or pouring processes. Therefore, it needs to cure a mixture of polymer monomers and liquid crystals to form a polymer network. Since the intensity of ultraviolet light required for curing the polymer monomers and a frame glue is different, the curing of the polymer monomers needs to be performed before the curing of the frame glue, in order to ensure the light-adjusting capability of the polymer monomers and to avoid liquid crystal puncture. During the curing of the frame glue, an ultraviolet light mask can be added at a side of the light-adjusting liquid crystal cell for shielding the ultraviolet light and preventing the ultraviolet light from irradiating at the polymer monomers, causing the frame glue to be exposed to light during the curing. However, the ultraviolet light will be diffracted at the periphery of the ultraviolet light mask. The diffracted light will make the polymer monomers close to the frame glue have a cross-linking reaction in advance, resulting in uneven haze distribution over inner surfaces after the polymer monomers are cured.

SUMMARY

Technical Problems

The embodiments of the present application provide a display panel, a manufacturing method thereof and a display device, for solving the problems of an existing display panel, in which the ultraviolet light will be diffracted at the periphery of a mask and the diffracted light will irradiate at the polymer monomers located adjacent to a frame glue when the ultraviolet light mask is used in curing the frame glue, and this causes a cross-linking reaction to occur in advance such that uneven haze distribution over inner surfaces after the polymer monomers are cured.

Technical Solutions

To solve above problems, the technical solutions provided in the present application are described below.

The present application provides a display panel, including a display body and a light-adjusting liquid crystal cell disposed at a side of the display body, the light-adjusting liquid crystal cell including a display area and a sealing area surrounding the display area, the light-adjusting liquid crystal cell including:

a first substrate;
a second substrate, disposed opposite to the first substrate;
a light-adjusting liquid crystal layer, disposed between the first substrate and the second substrate and located in the display area, the light-adjusting liquid crystal layer including a polymer network and liquid crystal molecules distributed in the polymer network; and
a sealing layer, disposed between the first substrate and the second substrate, and located in the sealing area,
wherein ultraviolet light transmittance of the first substrate in the display area is less than a predetermined threshold, and the ultraviolet light transmittance of the second substrate in the display area is greater than or equal to the predetermined threshold.

According to the display panel provided in the present application, the first substrate includes:
a first base; and
a first electrode layer, disposed at a side of the first base close to the light-adjusting liquid crystal layer,
the second substrate includes:
a second base; and
a second electrode layer, disposed at a side of the second base close to the light-adjusting liquid crystal layer,
wherein the ultraviolet light transmittance of the first electrode layer in the display area is less than the predetermined threshold, and the ultraviolet light transmittance of the second electrode layer in the display area is greater than or equal to the predetermined threshold.

According to the display panel provided in the present application, an orthographic projection of the first electrode layer onto the first base has a first edge, an orthographic projection of the sealing layer onto the first base has a second edge close to a side of the display area, and the first edge and the second edge overlap with each other.

According to the display panel provided in the present application, the predetermined threshold is greater than 10% and is less than or equal to 70%.

According to the display panel provided in the present application, the ultraviolet light transmittance of the first electrode layer in the display area is less than or equal to 10%, and the ultraviolet light transmittance of the second electrode layer in the display area is greater than or equal to 70%.

According to the display panel provided in the present application, visible light transmittance of the first electrode layer in the display area is greater than 80%, and the visible light transmittance of the second electrode layer in the display area is greater than 90%.

According to the display panel provided in the present application, a material of the first electrode layer includes one or more types selected from zinc oxide, aluminum-doped zinc oxide, zinc oxide/indium tin oxide, and indium tin oxide/zinc oxide/indium tin oxide, and a material of the second electrode layer includes one or more types selected from indium tin oxide and indium oxide.

According to the display panel provided in the present application, the first substrate includes:
a first base;
a first electrode layer, disposed at a side of the first base close to the light-adjusting liquid crystal layer; and
an ultraviolet light shielding layer, disposed at a side of the first base and located in the display area,
the second substrate includes:
a second base; and
a second electrode layer, disposed at a side of the second base close to the light-adjusting liquid crystal layer,
wherein the ultraviolet light transmittance of the first electrode layer in the display area is greater than or equal to the predetermined threshold, and the ultraviolet light transmittance of the second electrode layer in the display area is greater than or equal to the predetermined threshold.

According to the display panel provided in the present application, the ultraviolet light shielding layer is disposed on a side of the first base away from the light-adjusting liquid crystal layer; or the ultraviolet light shielding layer is disposed between the first base and the first electrode layer; or the ultraviolet light shielding layer is disposed at a side of the first electrode layer away from the first base.

According to the display panel provided in the present application, a material of the first electrode layer includes one or more types selected from indium tin oxide and indium oxide, and a material of the second electrode layer includes one or more types selected from indium tin oxide and indium oxide.

The present application provides a display device, including a display panel and a backlight module, in which the display panel includes a display body and a light-adjusting liquid crystal cell disposed at a side of the display body, the backlight module is disposed at a side of the display body away from the light-adjusting liquid crystal cell, and the light-adjusting liquid crystal cell includes a display area and a sealing area surrounding the display area, wherein the light-adjusting liquid crystal cell includes:
  a first substrate;
  a second substrate, disposed opposite to the first substrate;
  a light-adjusting liquid crystal layer, disposed between the first substrate and the second substrate and located in the display area, wherein the light-adjusting liquid crystal layer includes a polymer network and liquid crystal molecules distributed in the polymer network, the liquid crystal molecules are of a nematic liquid crystal composition, and the nematic liquid crystal composition includes any one of or a mixture of acrylates, methacrylates, styrene-based groups, or diacetyl groups; and
  a sealing layer, disposed between the first substrate and the second substrate, and located in the sealing area,
  wherein ultraviolet light transmittance of the first substrate in the display area is less than a predetermined threshold, and the ultraviolet light transmittance of the second substrate in the display area is greater than or equal to the predetermined threshold.

According to the display device provided in the present application, the first substrate includes:
  a first base; and
  a first electrode layer, disposed at a side of the first base close to the light-adjusting liquid crystal layer,
  the second substrate includes:
  a second base; and
  a second electrode layer, disposed at a side of the second base close to the light-adjusting liquid crystal layer,
  wherein the ultraviolet light transmittance of the first electrode layer in the display area is less than the predetermined threshold, and the ultraviolet light transmittance of the second electrode layer in the display area is greater than or equal to the predetermined threshold.

According to the display device provided in the present application, an orthographic projection of the first electrode layer onto the first base has a first edge, an orthographic projection of the sealing layer onto the first base has a second edge close to a side of the display area, and the first edge and the second edge overlap with each other.

According to the display device provided in the present application, the predetermined threshold is greater than 10% and is less than or equal to 70%.

According to the display device provided in the present application, the ultraviolet light transmittance of the first electrode layer in the display area is less than or equal to 10%, and the ultraviolet light transmittance of the second electrode layer in the display area is greater than or equal to 70%.

According to the display device provided in the present application, visible light transmittance of the first electrode layer in the display area is greater than 80%, and the visible light transmittance of the second electrode layer in the display area is greater than 90%.

According to the display device provided in the present application, the first substrate includes:
  a first base;
  a first electrode layer, disposed at a side of the first base close to the light-adjusting liquid crystal layer; and
  an ultraviolet light shielding layer, disposed at a side of the first base and located in the display area,
  the second substrate includes:
  a second base; and
  a second electrode layer, disposed at a side of the second base close to the light-adjusting liquid crystal layer,
  wherein the ultraviolet light transmittance of the first electrode layer in the display area is greater than or equal to the predetermined threshold, and the ultraviolet light transmittance of the second electrode layer in the display area is greater than or equal to the predetermined threshold.

According to the display device provided in the present application, the ultraviolet light shielding layer is disposed on a side of the first base away from the light-adjusting liquid crystal layer; or the ultraviolet light shielding layer is disposed between the first base and the first electrode layer; or the ultraviolet light shielding layer is disposed at a side of the first electrode layer away from the first base.

According to the display device provided in the present application, a material of the first electrode layer includes one or more types selected from zinc oxide, aluminum-doped zinc oxide, zinc oxide/indium tin oxide, and indium tin oxide/zinc oxide/indium tin oxide, and a material of the second electrode layer includes one or more types selected from indium tin oxide and indium oxide.

The present application provides a method for manufacturing a display panel, including the steps of:
  providing a first substrate and a second substrate, wherein a sealing layer is formed between the first substrate and the second substrate, and the sealing layer is located in a sealing area of a light-adjusting liquid crystal cell;
  injecting a polymer liquid crystal mixture between the first substrate and the second substrate, wherein the polymer liquid crystal mixture is located in a display area of the light-adjusting liquid crystal cell;
  providing an ultraviolet light mask which is located at a side of the first substrate away from the second substrate, and irradiating at the light-adjusting liquid crystal cell with ultraviolet light to cure the sealing layer, wherein a light shielding area of the ultraviolet light mask corresponds to the display area;
  irradiating at the light-adjusting liquid crystal cell with the ultraviolet light from a side of the second substrate away from the first substrate to cure the polymer liquid crystal mixture to form a polymer network; and
  providing a display body, and assembling the display body with the light-adjusting liquid crystal cell to form the display panel.

Beneficial Effects

The beneficial effects of this application are described below. In the display device, the manufacturing method thereof and the display device provided in the application, the ultraviolet light transmittance of the first substrate in the display area is smaller than the predetermined threshold. When the ultraviolet light is irradiated from a side of the first substrate away from the second substrate to cure the sealing layer, the intensity of diffracted light at the periphery of an ultraviolet light mask passing through the first substrate cannot reach the reaction threshold that makes the pre-polymerized molecules of a polymer liquid crystal mixture have cross-linking reaction to form the polymer network because the ultraviolet light transmittance of the first substrate is relatively low. In this way, it can prevent the pre-polymerized molecules from being exposed to light in advance during the curing of the sealing layer. It is beneficial to enhance the uniformity of haze distribution over inner surfaces of the light-adjusting liquid crystal cell. In addition, the ultraviolet light transmittance of the second substrate in the display area is greater than the predetermined threshold. When the ultraviolet light is irradiated from a side of the second substrate away from the first substrate to cure the pre-polymerized molecules, the ultraviolet light can pass through the second substrate with a low loss to irradiate at the pre-polymerized molecules because the ultraviolet light transmittance of the second substrate is relatively high. In this way, the pre-polymerized molecules can have the cross-linking reaction to form the polymer network such that the anti-peeping ability of the display panel is realized.

DESCRIPTION OF DRAWINGS

For explaining the technical solutions used in the embodiments of the present application more clearly, the appended figures to be used in describing the embodiments will be briefly introduced in the following. Obviously, the appended figures described below are only some of the embodiments of the present application, and those of ordinary skill in the art can further obtain other figures according to these figures without making any inventive effort.

REFERENCE NUMBERS

Figure 1:
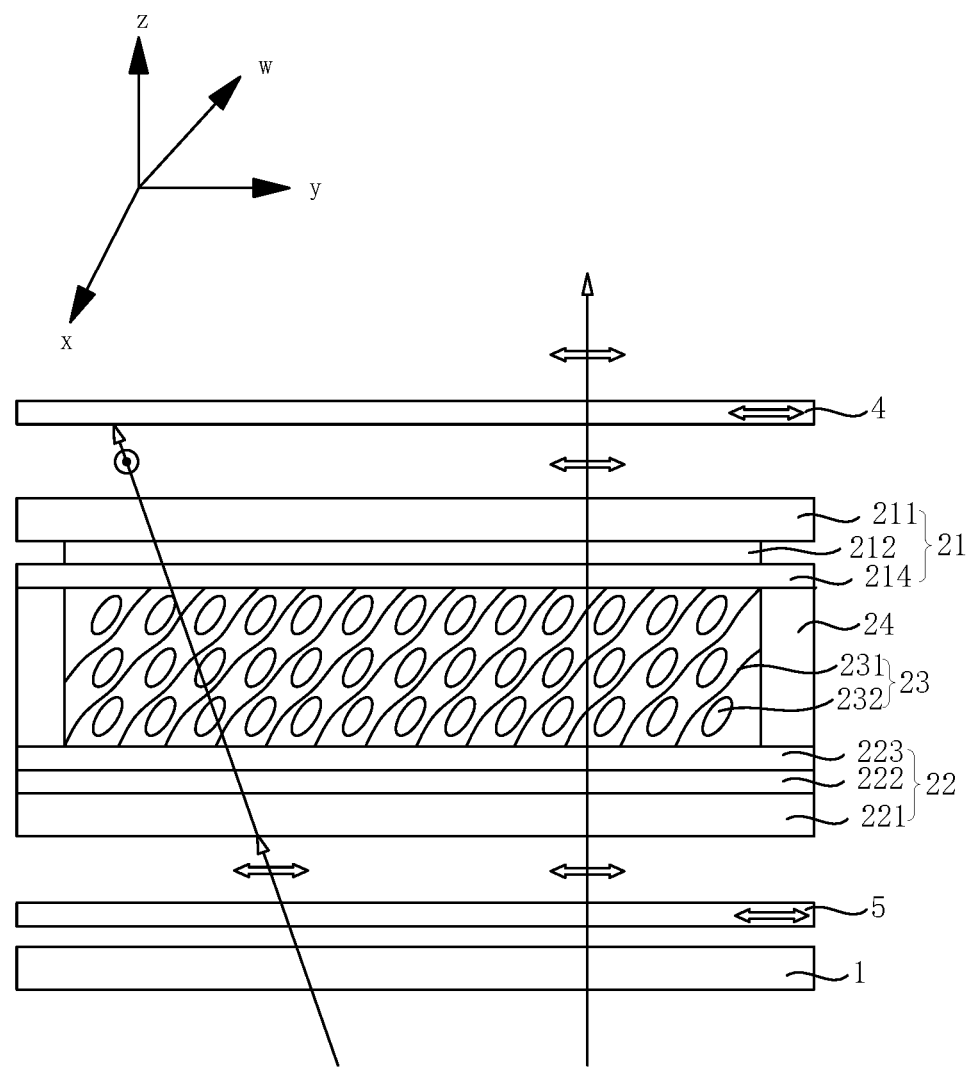
FIG. 1 is a schematic diagram illustrating a cross-sectional structure of a display panel provided in an embodiment of the present application.

1 display body; 2 light-adjusting liquid crystal cell; 2a display area; 2b sealing area; 3 ultraviolet light mask; 4 first polarizer; 5 second polarizer;

21 first substrate; 211 first base; 212 first electrode layer; 212a first edge; 213 ultraviolet light shielding layer; 213a third edge; 214 first alignment layer;

22 second substrate; 221 second base; 222 second electrode layer; 223 second alignment layer;

23 light-adjusting liquid crystal layer; 231 polymer network; 232 liquid crystal molecules; 233 pre-polymerized molecules; 24 sealing layer; 24a second edge.

DESCRIPTION OF EMBODIMENTS OF THE DISCLOSURE

The technical solutions in the embodiments of the present application are clearly and completely described below with reference to appending drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application. In addition, it should be understood that the specific embodiments described herein are merely for illustrating and interpreting the present application and the present application is not limited thereto. In the present application, direction words used herein, such as "upper" and "lower", generally refer to the upper and lower of a device under an actual use or operation state, as the directions shown in the drawings, unless otherwise specified; "inner" and "outer" are for the contour of the device.

Figure 2A:
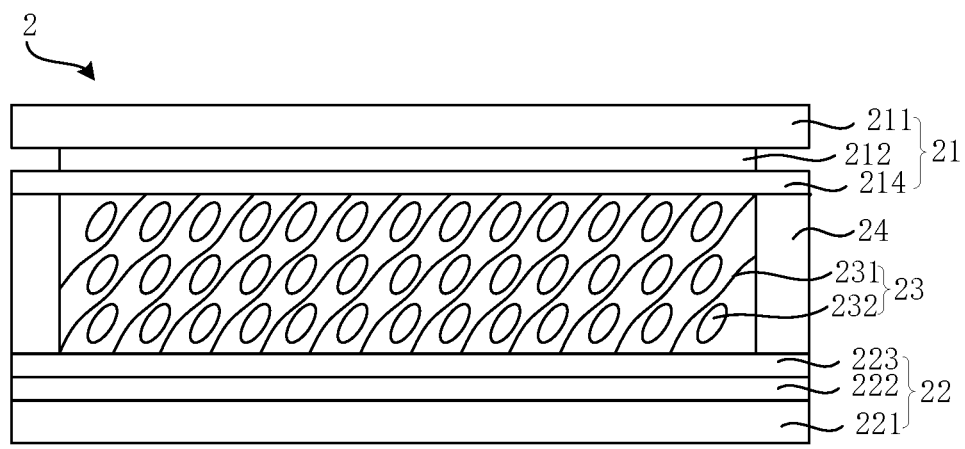
FIG. 2A is a schematic diagram illustrating a cross-sectional structure of a first type of light-adjusting liquid crystal cell provided in an embodiment of the present application.
Figure 2B:
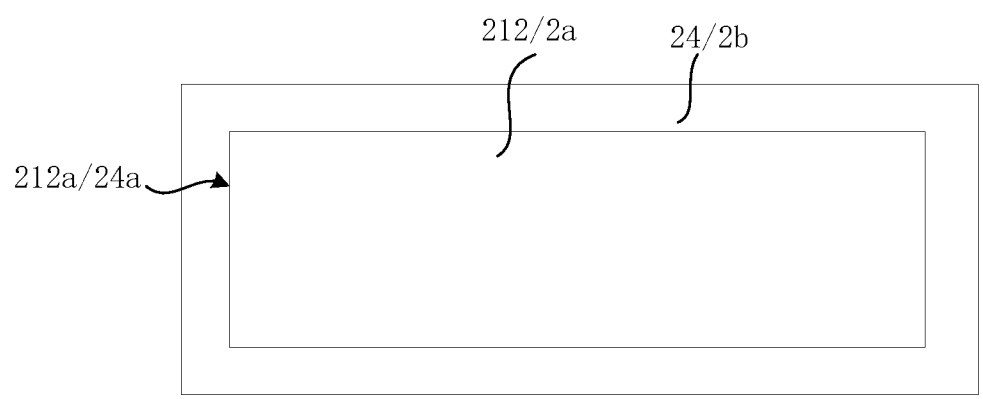
FIG. 2B is a schematic diagram illustrating a top-view structure of the light-adjusting liquid crystal cell in FIG. 2A.

Please refer to FIGS. 1, 2A to 2B and FIG. 7B. FIG. 1 is a schematic diagram illustrating a cross-sectional structure of a display panel provided in an embodiment of the present application. FIG. 2A is a schematic diagram illustrating a cross-sectional structure of a first type of light-adjusting liquid crystal cell provided in an embodiment of the present application. FIG. 2B is a schematic diagram illustrating a top-view structure of the light-adjusting liquid crystal cell in FIG. 2A.

The display panel provided in the embodiment of the present application includes a display body 1 and a light-adjusting liquid crystal cell 2 arranged at a side of the display body 1. The display body 1 may be a display liquid crystal cell. The light-adjusting liquid crystal cell 2 is configured to control deflection of the light emitted from the display body 1 such that the display panel can selectively transmit the light at different viewing angles. In this way, it can play a role of anti-peeping at a specific viewing angle. Also, it can realize a switch between an anti-peeping display mode and an ordinary display mode, thereby improving the applicability of the display panel.

Specifically, the light-adjusting liquid crystal cell 2 includes a display area 2a and a sealing area 2b surrounding the display area 2a. The display area 2a is for placing a light-adjusting liquid crystal layer 23 and is used for light adjustment and realizing a display of images. The sealing area 2b is used for adhering a frame glue.

The light-adjusting liquid crystal cell 2 includes a first substrate 21, a second substrate 22, the light-adjusting liquid crystal layer 23, and a sealing layer 24. The second substrate 22 is disposed opposite to the first substrate 21. The light-adjusting liquid crystal layer 23 is disposed between the first substrate 21 and the second substrate 22 and is located in the display area 2a. The light-adjusting liquid crystal layer 23 includes a polymer network 231 and liquid crystal molecules 232 distributed in the polymer network 231. The sealing layer 24 is disposed between the first substrate 21 and the second substrate 22 and is located in the sealing area 2b.

It needs to be noted that the polymer network 231 is formed by cross-linking pre-polymerized molecules 233, and the pre-polymerized molecules 233 need to be irradiated by ultraviolet light with sufficient intensity to have cross-linking reaction, that is, when the first substrate 21 or the second substrate 22 has ultraviolet light transmittance greater than or equal to a predetermined threshold which is the smallest ultraviolet light transmittance of the substrate that makes the pre-polymerized molecules 233 have cross-linking reaction under the irradiation of ultraviolet light, the ultraviolet light intensity can thus reach a reaction threshold that makes the pre-polymerized molecules 233 have the cross-linking reaction. In this way, the pre-polymerized molecules 233 can undergo the cross-linking reaction to form the polymer network 231.

In the embodiment of the present application, the ultraviolet light transmittance of the first substrate 21 in the display area 2a is smaller than the predetermined threshold. When the ultraviolet light is irradiated from a side of the first substrate 21 away from the second substrate 22 to cure the sealing layer 24, the intensity of diffracted light at the periphery of an ultraviolet light mask passing through the first substrate 21 cannot reach the reaction threshold that the pre-polymerized molecules 233 has the cross-linking reaction because the ultraviolet light transmittance of the first substrate 21 is relatively low. In this way, it can prevent the pre-polymerized molecules 233 from being exposed to light in advance during the curing of the sealing layer 24. It is beneficial to enhance the uniformity of haze distribution over inner surfaces of the light-adjusting liquid crystal cell 2. In addition, the ultraviolet light transmittance of the second substrate 22 in the display area 2a is greater than the predetermined threshold. When the ultraviolet light is irradiated from a side of the second substrate 22 away from the first substrate 21 to cure the liquid crystal molecules 232, the ultraviolet light can pass through the second substrate 22 with a low loss to irradiate at the pre-polymerized molecules 233 because the ultraviolet light transmittance of the second substrate 22 is relatively high. In this way, the pre-polymerized molecules 233 can have the cross-linking reaction to form the polymer network such that the anti-peeping ability of the display panel is realized.

Specifically, the pre-polymerized molecules 233 includes pre-polymerized monomers. The liquid crystal molecules 232 are of a nematic liquid crystal composition. The nematic liquid crystal composition includes any one of or a mixture of acrylates, methacrylates, styrene-based groups, or diacetyl groups.

In one implementation, referring to FIGS. 2A and 2B, a first electrode layer 212 of the first substrate 21 adopts low ultraviolet light transmittance, and a second electrode layer 222 of the second substrate 22 adopts high ultraviolet light transmittance. In this design, the first substrate 21 with lower ultraviolet light transmittance in the display area 2a is realized.

Specifically, the first substrate 21 includes a first base 211 and the first electrode layer 212. The first electrode layer 212 is disposed at a side of the first base 211 close to the light-adjusting liquid crystal layer 23. The ultraviolet light transmittance of the first electrode layer 212 in the display area 2a is less than the predetermined threshold. When the ultraviolet light is irradiated from a side of the first substrate 21 away from the second substrate 22 to cure the sealing layer 24, the ultraviolet light intensity obtained after the diffracted light at the periphery of the ultraviolet light mask passes through the first electrode layer 212 is reduced dramatically because the ultraviolet light transmittance of the first electrode layer 212 is relatively low, and thus the predetermined threshold cannot be reached. Accordingly, the reaction threshold that makes the pre-polymerized molecules 233 have the cross-linking reaction cannot be reached. Therefore, it can prevent the pre-polymerized molecules 233 from being exposed to light in advance. It is beneficial to enhance the uniformity of haze distribution over inner surfaces of the light-adjusting liquid crystal cell 2.

The second substrate 22 includes a second base 221 and the second electrode layer 222. The second electrode layer 222 is disposed at a side of the second base 221 close to the light-adjusting liquid crystal layer 23. The ultraviolet light transmittance of the second electrode layer 222 in the display area 2a is greater than the predetermined threshold. When the ultraviolet light is irradiated from a side of the second substrate 22 away from the first substrate 21 to cure the pre-polymerized molecules 233, the ultraviolet light can pass through the second electrode layer 222 with a low loss to irradiate at the pre-polymerized molecules 233 because the ultraviolet light transmittance of the second electrode layer 222 is relatively high. In this way, the reaction threshold that makes the pre-polymerized molecules 233 have the cross-linking reaction can be reached, and the pre-polymerized molecules 233 can have the cross-linking reaction to form the polymer network 231 such that the anti-peeping ability of the display panel is realized.

Further, the orthographic projection of the first electrode layer 212 onto the first base 211 has a first edge 212a, and the orthographic projection of the sealing layer 24 onto the first base 211 has a second edge 24a close to a side of the display area 2a. The first edge 212a and the second edge 24a overlap with each other to prevent the first electrode layer 212 from shielding the sealing layer 24 without affecting the curing of the sealing layer 24.

Optionally, the first electrode layer 212 can be processed by a photolithography process such that the part of the first electrode layer 212 located in the sealing area 2b is developed and etched away. In this way, the ultraviolet light irradiated from a side of the first substrate 21 away from the second substrate 22 can be irradiated at the sealing layer 24. The photomask used for processing the first electrode layer 212 and the ultraviolet light mask used for curing the sealing layer 24 can be a same photomask. It is beneficial to simplify manufacturing process and reduce the cost.

Specifically, in an embodiment of the present application, in order to ensure that the pre-polymerized molecules 233 can completely undergo a cross-linking reaction, the predetermined threshold is greater than 10% and less than or equal to 70%.

Further, in order to ensure that the ultraviolet light passing through the first electrode layer 212 is not sufficient to make the pre-polymerized molecules 233 have the cross-linking reaction, the ultraviolet light transmittance of the first electrode layer 212 in the display area 2a is less than 10%. On the contrary, in order to ensure that the ultraviolet light passing through the second electrode layer 212 can make the pre-polymerized molecules 233 fully undergo the cross-linking reaction, the ultraviolet light transmittance of the second electrode layer 222 in the display area 2a is greater than or equal to 70%.

Further, the visible light transmittance of the first electrode layer 212 in the display area 2a is greater than 80%, and the visible light transmittance of the second electrode layer 222 in the display area 2a is greater than 90% such that it is ensured that both the first electrode layer 212 and the second electrode layer 222 have high visible light transmittance in the display area 2a, thereby ensuring that both the first substrate 21 and the second substrate 22 have high visible light transmittance in the display area 2a. In this way, the light-adjusting liquid crystal cell 2 has high visible light transmittance during the light adjusting and the displaying. It is beneficial to improve display effect.

Specifically, in this implementation, the first electrode layer 212 adopts a conductive material with low ultraviolet light transmittance, and the second electrode layer 222 adopts a conductive material with high ultraviolet light transmittance.

Optionally, the material of the first electrode layer 212 includes one or more types selected from zinc oxide, aluminum-doped zinc oxide, zinc oxide/indium tin oxide, and indium tin oxide/zinc oxide/indium tin oxide. The mass fraction of aluminum doped in the aluminum-doped zinc oxide is 1% to 5%. The material of the second electrode layer 222 includes one or more types selected from indium tin oxide and indium oxide.

Figure 3A:
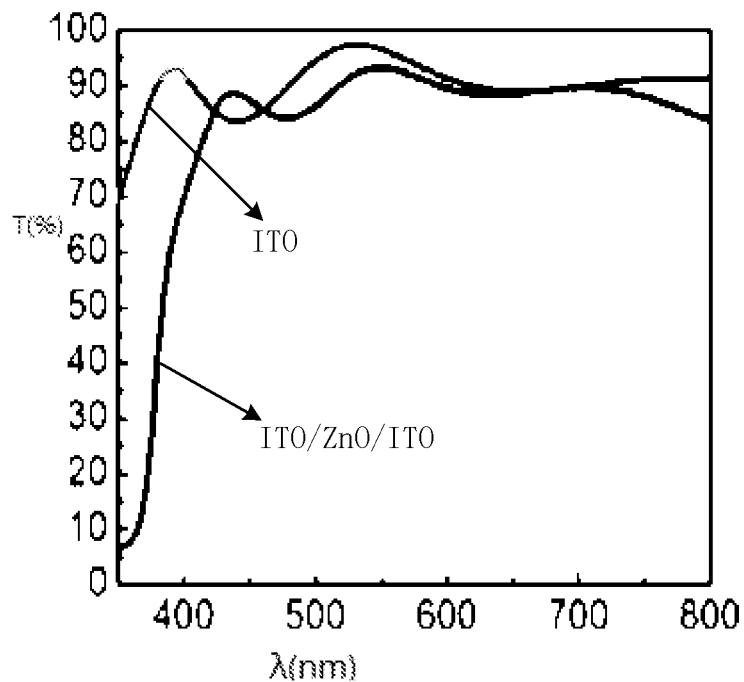
FIG. 3A is a schematic diagram illustrating the relationship between the ultraviolet wavelength and the ultraviolet light transmittance of a first electrode layer and a second electrode layer.

Please refer to FIG. 3A, which is a schematic diagram illustrating the relationship between the ultraviolet wavelength and the ultraviolet light transmittance of the first electrode layer and the second electrode layer. It needs to be noted that the first electrode layer 212 is made of laminated layers formed by indium tin oxide/zinc oxide/indium tin oxide, and the second electrode layer 222 is made of indium tin oxide. Generally, the wavelength of ultraviolet light is less than 400 nanometers. As the wavelength of ultraviolet light increases, the ultraviolet light transmittance of the first electrode layer 212 shows an increasing tendency and the ultraviolet light transmittance of the second electrode layer 222 is greater than 70%. In this wavelength range, the ultraviolet light transmittance of the first electrode layer 212 and the second electrode layer 222 has a large gap. Specifically, when the wavelength of ultraviolet light is 365 nanometers, the ultraviolet light transmittance of the first electrode layer 212 is less than 10% and the ultraviolet light transmittance of the second electrode layer 222 is greater than 90%. At this point, the ultraviolet light transmittance of the first electrode layer 212 and the second electrode layer 222 has the largest gap.

Figure 3B:
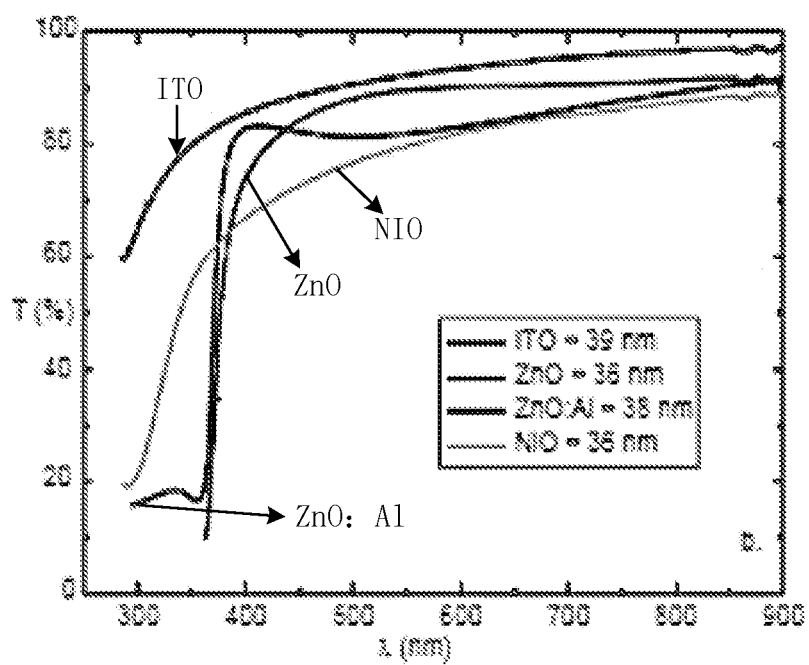
FIG. 3B is a schematic diagram illustrating the relationship between the ultraviolet light wavelength and the ultraviolet light transmittance for different materials.

Further, please refer to FIG. 3B, which is a schematic diagram illustrating the relationship between the ultraviolet light wavelength and the ultraviolet light transmittance for different materials. It needs to be noted that when the wavelength of ultraviolet light is 365 nanometers, the ultraviolet light transmittance of indium tin oxide>the ultraviolet light transmittance of nickel oxide>the ultraviolet light transmittance of aluminum-doped zinc oxide>the ultraviolet light transmittance of zinc oxide. Therefore, preferably, when the wavelength of ultraviolet light is 365 nanometers, zinc oxide can be selected as the material of the first electrode layer 212 and indium tin oxide can be selected as the material of the second electrode layer 222 for better satisfying the needs of different ultraviolet light transmittance.

Specifically, the thickness of the first electrode layer 212 ranges from 100 nanometers to 1000 nanometers, for example, 100 nanometers, 300 nanometers, 500 nanometers, or 1000 nanometers. In one implementation, when laminated layers formed by indium tin oxide/zinc oxide/indium tin oxide are adopted as the first electrode layer 212, the thickness of the laminated layers formed by indium tin oxide/zinc oxide/indium tin oxide may be 150 nanometers/80 nanometers/300 nanometers, respectively.

Specifically, the thickness of the second electrode layer 222 ranges from 50 nanometers to 1000 nanometers, for example, 50 nanometers, 100 nanometers, 300 nanometers, or 1000 nanometers.

Figure 4A:
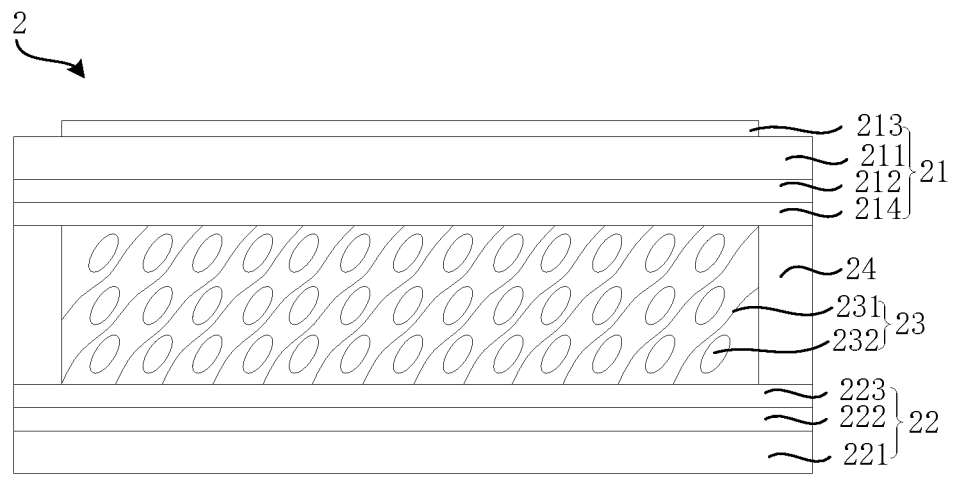
FIG. 4A is a schematic diagram illustrating a cross-sectional structure of a second type of light-adjusting liquid crystal cell provided in an embodiment of the present application.
Figure 4B:
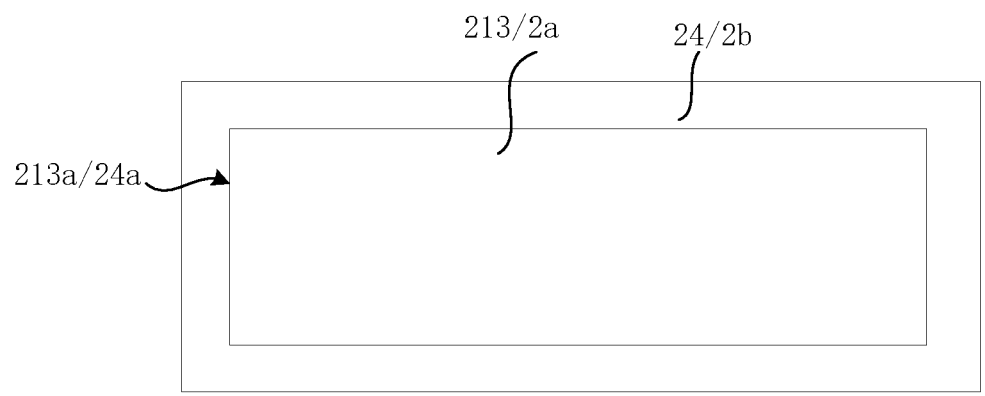
FIG. 4B is a schematic diagram illustrating a top-view structure of the light-adjusting liquid crystal cell in FIG. 4A.
Figure 5:
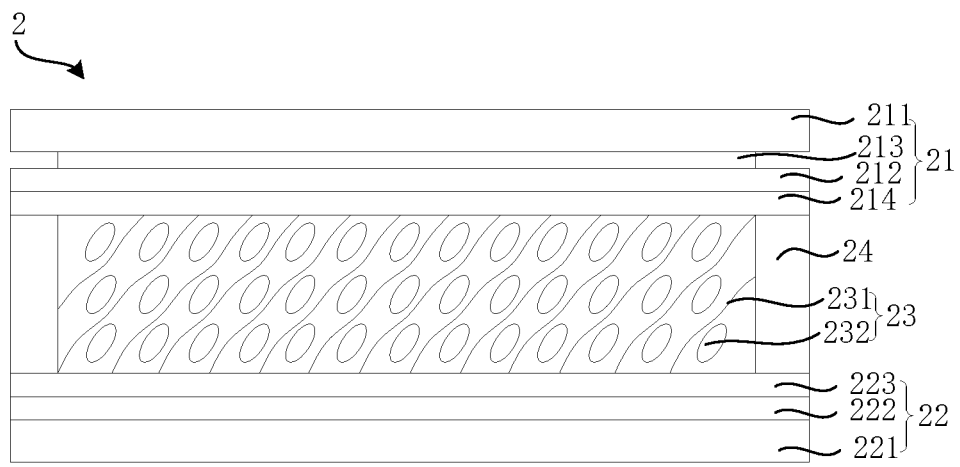
FIG. 5 is a schematic diagram illustrating a cross-sectional structure of a third type of light-adjusting liquid crystal cell provided in an embodiment of the present application.
Figure 6:
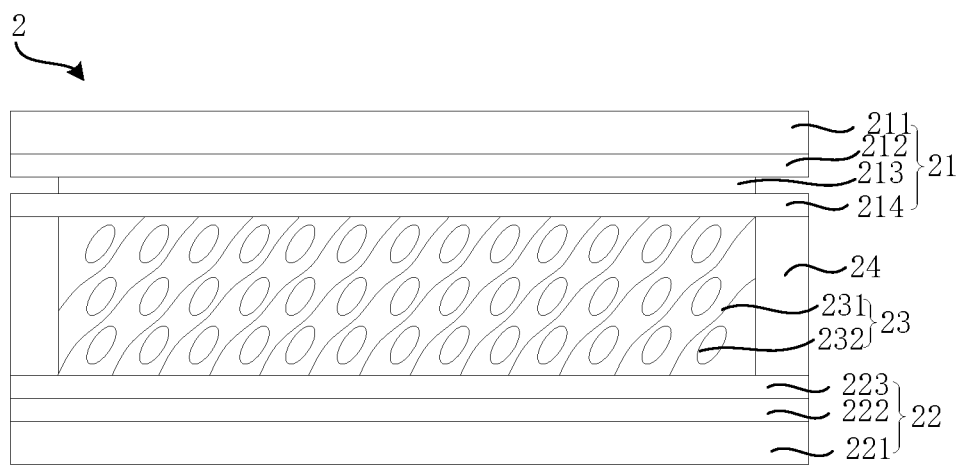
FIG. 6 is a schematic diagram illustrating a cross-sectional structure of a fourth type of light-adjusting liquid crystal cell provided in an embodiment of the present application.

In another implementation, please refer to FIGS. 4A to 4B and 5 to 6. FIG. 4A is a schematic diagram illustrating a cross-sectional structure of a second type of light-adjusting liquid crystal cell provided in an embodiment of the present application. FIG. 4B is a schematic diagram illustrating a top-view structure of the light-adjusting liquid crystal cell in FIG. 4A. FIG. 5 is a schematic diagram illustrating a cross-sectional structure of a third type of light-adjusting liquid crystal cell provided in an embodiment of the present application. FIG. 6 is a schematic diagram illustrating a cross-sectional structure of a fourth type of light-adjusting liquid crystal cell provided in an embodiment of the present application.

In this implementation, an ultraviolet light shielding layer 213 is provided on the first substrate 21 to realize the first substrate 21 having lower ultraviolet light transmittance in the display area 2a. Compared to the design of FIG. 2A, the afore-described functions can be realized in this implementation without changing the material of the first electrode layer 212.

Specifically, the first substrate 21 includes a first base 211, a first electrode layer 212 and the ultraviolet light shielding layer 213. The first electrode layer 212 is disposed at a side of the first base 211 close to the light-adjusting liquid crystal layer 23. The ultraviolet light shielding layer 213 is disposed at a side of the first base 211 and is located in the display area 2a. The ultraviolet light transmittance of the first electrode layer 212 in the display area 2a is greater than or equal to the predetermined threshold. When the ultraviolet light is irradiated from a side of the first substrate 21 away from the second substrate 22 to cure the sealing layer 24, the ultraviolet light cannot irradiate at the light-adjusting liquid crystal layer 23 because most part of the diffracted light at the periphery of the ultraviolet light mask is shielded by the ultraviolet light shielding layer 213. In this way, the intensity of ultraviolet light irradiated at the light-adjusting liquid crystal layer 23 is reduced, and the reaction threshold for the pre-polymerized molecules 233 to have the cross-linking reaction cannot be reached. Therefore, it can prevent the pre-polymerized molecules 233 from being exposed to light in advance. It is beneficial to enhance the uniformity of haze distribution over inner surfaces of the light-adjusting liquid crystal cell 2.

Similarly, the second substrate 22 includes a second base 221 and a second electrode layer 222. The second electrode layer 222 is disposed in the display area 2a where the ultraviolet light transmittance is greater than or equal to the reaction threshold for the pre-polymerized molecules 233 to have the cross-linking reaction. When the ultraviolet light is irradiated from a side of the second substrate 22 away from the first substrate 21 to cure the pre-polymerized molecules 233, the ultraviolet light can pass through the second electrode layer 222 with a low loss to irradiate at the pre-polymerized molecules 233 because the ultraviolet light transmittance of the second electrode layer 222 is relatively high. In this way, the intensity of ultraviolet light can cause the pre-polymerized molecules 233 to have the cross-linking reaction to form the polymer network 231 such that the anti-peeping ability of the display panel is realized.

Optionally, in this implementation, the material of the first electrode layer 212 includes one or more types selected from indium tin oxide and indium oxide, and the material of the second electrode layer 222 includes one or more types selected from indium tin oxide and indium oxide.

In one implementation, referring to FIG. 4A, the ultraviolet light shielding layer 213 is disposed on a side of the first base 211 away from the light-adjusting liquid crystal layer 23.

In one implementation, the ultraviolet light shielding layer 213 is disposed on a side of the first base 211 close to the light-adjusting liquid crystal layer 23. For example, referring to FIG. 5, the difference between FIG. 5 and FIG. 4A is that the ultraviolet light shielding layer 213 is disposed between the first base 211 and the first electrode layer 212. For another example, referring to FIG. 6, the difference between FIG. 6 and FIG. 4A is that the ultraviolet light shielding layer is disposed at a side of the first electrode layer 212 away from the first base 211.

Similarly, referring to FIG. 4B again, the orthographic projection of the ultraviolet light shielding layer 213 onto the first base 211 has a third edge 213a, and the orthographic projection of the sealing layer 24 onto the first base 211 has a second edge 24a close to a side of the display area 2a. The third edge 213a and the second edge 24a overlap with each other to prevent the ultraviolet light shielding layer 213 from shielding the sealing layer 24 without affecting the curing of the sealing layer 24.

Further, referring to FIGS. 1, 2A, 4A and 5 to 6, the first substrate 21 further includes a first alignment layer 214, and the second substrate 22 further includes a second alignment layer 223. The first alignment layer 214 is disposed at a side of the first base 211 close to the light-adjusting liquid crystal layer 23, and the second alignment layer 223 is disposed at a side of the second base 221 close to the light-adjusting liquid crystal layer 23. The first alignment layer 214 and the second alignment layer 223 are configured to provide alignment direction for the liquid crystal molecules 232.

Specifically, the first alignment layer 214 is disposed at a side of the first electrode layer 212 close to the light-adjusting liquid crystal layer 23, and the second alignment layer 223 is disposed at a side of the second electrode layer 222 close to the light-adjusting liquid crystal layer 23. Alternatively, the first alignment layer 214 is disposed at a side of the ultraviolet light shielding layer close to the light-adjusting liquid crystal layer 23, and the second alignment layer 223 is disposed at a side of the second electrode layer 222 close to the light-adjusting liquid crystal layer 23.

Further, referring to FIG. 1, the display panel further includes a first polarizer 4 and a second polarizer 5. The first polarizer 4 is disposed at a side of the display body 1, and the second polarizer 5 is disposed at a side of the light-adjusting liquid crystal layer 23 away from the first polarizer 4. The direction of optical axis of the first polarizer 4 is parallel to the direction of optical axis of the second polarizer 5. The polymer network 231 is arranged along a first direction w, and the first direction w is inclined with respect to a normal line of the first polarizer 4.

It can be understood that in an anti-peeping display mode, the light-adjusting liquid crystal layer 23 is used to make the incident light transmitted along the normal line z of the first polarizer 4 pass through the second polarizer 5 and make the incident light inclined with respect to the normal line z of the first polarizer 4 be shielded or partially shielded by the second polarizer 5, and in an ordinary display mode, the long axis of the liquid crystal molecules 232 is different from the first direction such that more light can pass through the second polarizer 5 to increase the range of viewing angle for the display panel in the ordinary display mode. In this way, the viewing angle of the display panel in the ordinary display mode is greater than the viewing angle of the display panel in the anti-peeping display mode.

An embodiment of the present application further provides a display device. The display device includes the display panel in the afore-described embodiments and a backlight module. The backlight module is disposed at a side of the display body 1 away from the light-adjusting liquid crystal cell 2 and is configured to provide a backlight source for the display body 1.

Figure 7:
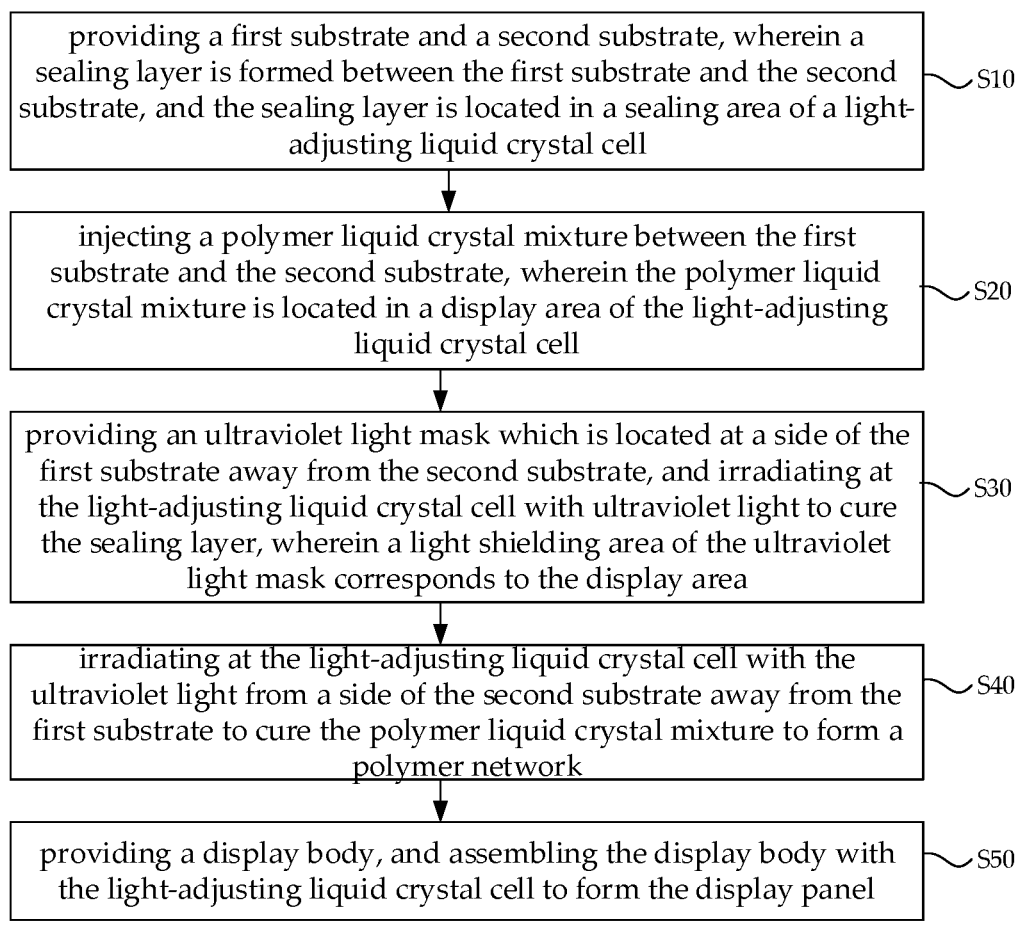
FIG. 7 is a schematic flowchart of a method for manufacturing a display panel provided in an embodiment of the present application.

Please refer to FIGS. 7 and 7A to 7E. FIG. 7 is a schematic flowchart of a method for manufacturing a display panel provided in an embodiment of the present application. FIGS. 7A to 7E are schematic diagrams illustrating the processes of a method for manufacturing a display panel provided in an embodiment of the present application. An embodiment of the present application further provides a method for manufacturing a display panel, which includes the following steps:

S10: providing a first substrate 21 and a second substrate 22, wherein a sealing layer 24 is formed between the first substrate 21 and the second substrate 22, and the sealing layer 24 is located in a sealing area 2b of the light-adjusting liquid crystal cell 2.

Figure 7A:
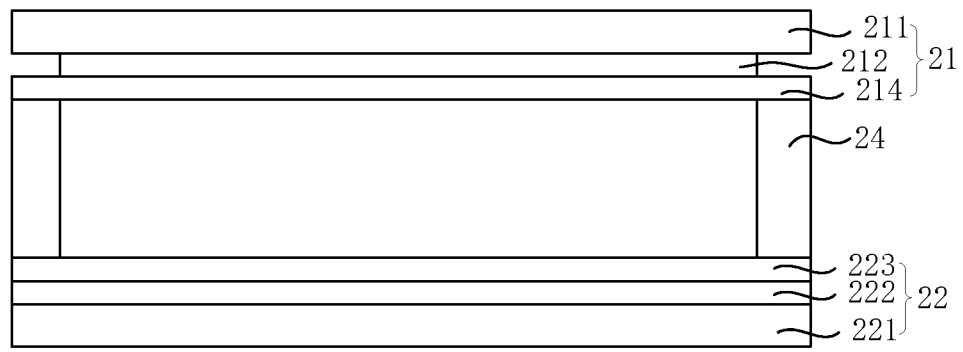
FIGS. 7A to 7E are schematic diagrams illustrating the processes of a method for manufacturing a display panel provided in an embodiment of the present application.

Specifically, referring to FIG. 7A, firstly, the sealing layer 24 may be formed on the first substrate 21 or the second substrate 22 by a coating process. After that, a cell alignment process is applied to the first substrate 21 and the second substrate 22.

S20: injecting a polymer liquid crystal mixture between the first substrate 21 and the second substrate 22, wherein the polymer liquid crystal mixture is located in a display area 2a of the light-adjusting liquid crystal cell 2.

Figure 7B:
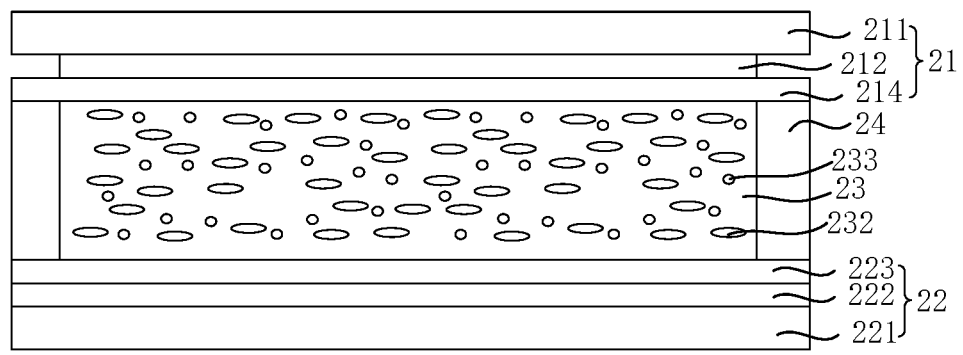

Specifically, referring to FIG. 7B, the polymer liquid crystal mixture can be injected between the first substrate 21 and the second substrate 22 by using a liquid crystal dripping or pouring process. The polymer liquid crystal mixture includes a plurality of liquid crystal molecules 232 and a plurality of pre-polymerized molecules 233.

S30: providing an ultraviolet light mask 3 which is located at a side of the first substrate 21 away from the second substrate 22, and irradiating the light-adjusting liquid crystal cell 2 with ultraviolet light to cure the sealing layer 24, wherein a light shielding area of the ultraviolet light mask 3 corresponds to the display area 2a.

Figure 7C:
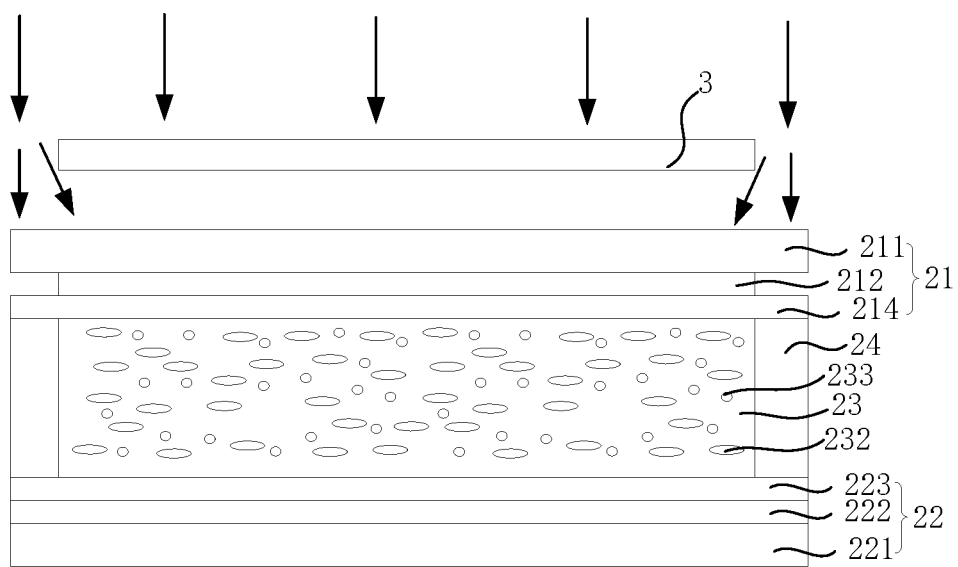

Specifically, referring to FIG. 7C, the ultraviolet light is irradiated to the light-adjusting liquid crystal cell 2 from a side of the ultraviolet light mask 3 away from the first substrate 21. Since the ultraviolet light transmittance of the first substrate 21 in the display area 2a is less than the predetermined threshold, which is the minimum ultraviolet light transmittance of the substrate that makes the pre-polymerized molecules 233 have cross-linking reaction under ultraviolet light irradiation, the intensity of the diffracted light passing through the first substrate 21 at the periphery of the ultraviolet light mask 3 cannot reach the reaction threshold that makes the pre-polymerized molecules 233 have the cross-linking reaction because the ultraviolet light transmittance of the substrate 21 is relatively low. Therefore, it can prevent the pre-polymerized molecules 233 from being exposed to light in advance. It is beneficial to enhance the uniformity of haze distribution over inner surfaces of the light-adjusting liquid crystal cell 2.

Optionally, the ultraviolet light mask 3 may be disposed corresponding to the display area 2a only. In this case, the ultraviolet light mask 3 only includes the light shielding area. The ultraviolet light mask 3 may also be disposed corresponding to the entire light-adjusting liquid crystal cell 2. Specifically, the ultraviolet light mask 3 includes a light shielding area and a light transmitting area, wherein the light shielding area corresponds to the display area 2a and the light transmitting area corresponds to the sealing area 2b.

S40: irradiating at the light-adjusting liquid crystal cell 2 with ultraviolet light from a side of the second substrate 22 away from the first substrate 21 to cure the polymer liquid crystal mixture to form a polymer network.

Figure 7D:
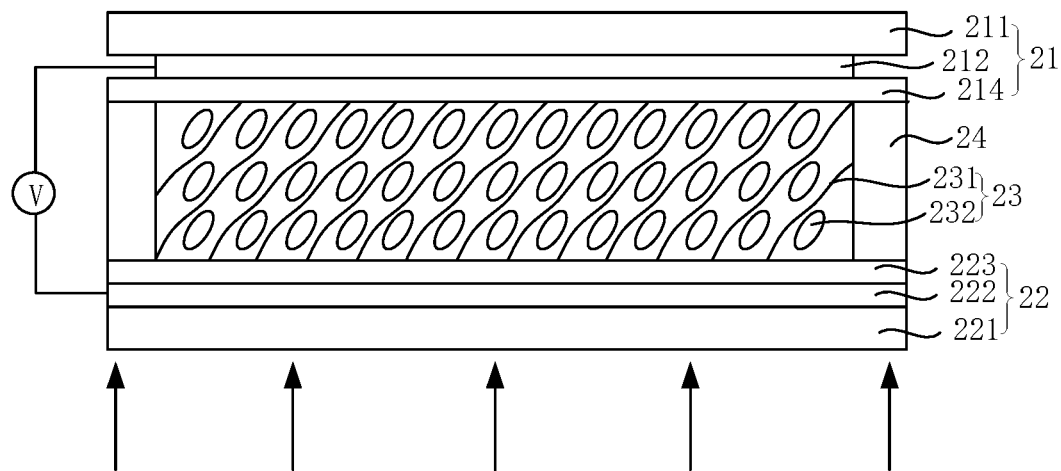

Specifically, referring to FIG. 7D, the ultraviolet light transmittance of the second substrate 22 in the display area 2a is greater than the predetermined threshold. A specific voltage is applied to the light-adjusting liquid crystal cell 2 such that the liquid crystal molecules 232 deviate at a specific angle. When the voltage is applied, the ultraviolet light is irradiated from a side of the second substrate 22 away from the first substrate 21 to cause the pre-polymerized molecules 233 to undergo a cross-linking reaction to form the polymer network 231 such that an anti-peeping ability of the display panel is realized.

S50: providing a display body, and assembling the display body with the light-adjusting liquid crystal cell 2 to form the display panel.

Figure 7E:
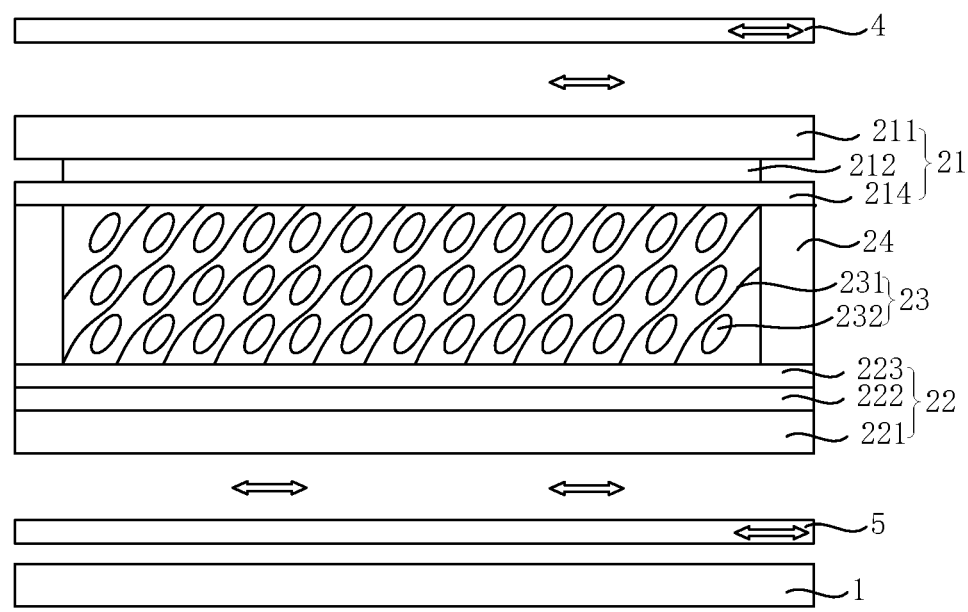

Specifically, referring to FIG. 7E, the display body may be a liquid crystal display cell. The display body may be located at an upper side or a lower side of the light-adjusting liquid crystal cell 2. The embodiment of the present application is not limited to this case.

The beneficial effects are described below. In the display device, the method for manufacturing a display panel, and the display device provided in the embodiments of the present application, the ultraviolet light transmittance of the first substrate in the display area is smaller than the predetermined threshold. When the ultraviolet light is irradiated from a side of the first substrate away from the second substrate to cure the sealing layer, the intensity of diffracted light at the periphery of an ultraviolet light mask passing through the first substrate cannot reach the reaction threshold that makes the pre-polymerized molecules of a polymer liquid crystal mixture have cross-linking reaction to form the polymer network because the ultraviolet light transmittance of the first substrate is relatively low. In this way, it can prevent the pre-polymerized molecules from being exposed to light in advance during the curing of the sealing layer. It is beneficial to enhance the uniformity of haze distribution over inner surfaces of the light-adjusting liquid crystal cell. In addition, the ultraviolet light transmittance of the second substrate in the display area is greater than the predetermined threshold. When the ultraviolet light is irradiated from a side of the second substrate away from the first substrate to cure the pre-polymerized molecules, the ultraviolet light can pass through the second substrate with a low loss to irradiate at the pre-polymerized molecules because the ultraviolet light transmittance of the second substrate is relatively high. In this way, the pre-polymerized molecules can have the cross-linking reaction to form the polymer network such that the anti-peeping ability of the display panel is realized.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

The invention claimed is:

1. A display panel, comprising a display body and a light-adjusting liquid crystal cell disposed at a side of the display body, the light-adjusting liquid crystal cell comprising a display area and a sealing area surrounding the display area, the light-adjusting liquid crystal cell comprising:
a first substrate;
a second substrate, disposed opposite to the first substrate;
a light-adjusting liquid crystal layer, disposed between the first substrate and the second substrate and located in the display area, the light-adjusting liquid crystal layer comprising a polymer network and liquid crystal molecules distributed in the polymer network;
a sealing layer, disposed between the first substrate and the second substrate, and located in the sealing area
a first polarizer, disposed at one side of the display body; and
a second polarizer, disposed at one side of the light-adjusting liquid crystal layer away from the first polarizer,
wherein ultraviolet light transmittance of the first substrate in the display area is less than a predetermined threshold, and the ultraviolet light transmittance of the second substrate in the display area is greater than or equal to the predetermined threshold;
wherein the predetermined threshold is a smallest value of the ultraviolet light transmittance of either the first substrate or the second substrate in the display area that allows ultraviolet light to cause cross-linking reaction in the light-adjusting liquid crystal layer for forming the polymer network under irradiation of ultraviolet light; and
wherein a direction of an optical axis of the first polarizer is parallel to a direction of an optical axis of the second polarizer, the polymer network is arranged along a first direction, and the first direction is inclined with respect to a normal line of the first substrate.

2. The display panel of claim 1, wherein the first substrate comprises:
a first base; and
a first electrode layer, disposed at a side of the first base close to the light-adjusting liquid crystal layer,
the second substrate comprises:
a second base; and
a second electrode layer, disposed at a side of the second base close to the light-adjusting liquid crystal layer,
wherein the ultraviolet light transmittance of the first electrode layer in the display area is less than the predetermined threshold, and the ultraviolet light transmittance of the second electrode layer in the display area is greater than or equal to the predetermined threshold.

3. The display panel of claim 2, wherein an orthographic projection of the first electrode layer onto the first base has a first edge, an orthographic projection of the sealing layer onto the first base has a second edge close to a side of the display area, and the first edge and the second edge overlap with each other.

4. The display panel of claim 2, wherein the predetermined threshold is greater than 10% and is less than or equal to 70%.

5. The display panel of claim 4, wherein the ultraviolet light transmittance of the first electrode layer in the display area is less than or equal to 10%, and the ultraviolet light transmittance of the second electrode layer in the display area is greater than or equal to 70%.

6. The display panel of claim 2, wherein visible light transmittance of the first electrode layer in the display area is greater than 80%, and the visible light transmittance of the second electrode layer in the display area is greater than 90%.

7. The display panel of claim 2, wherein a material of the first electrode layer comprises one or more types selected from zinc oxide, aluminum-doped zinc oxide, zinc oxide/indium tin oxide, and indium tin oxide/zinc oxide/indium tin oxide, and a material of the second electrode layer comprises one or more types selected from indium tin oxide and indium oxide.

8. The display panel of claim 1, wherein the first substrate comprises:
a first base;
a first electrode layer, disposed at a side of the first base close to the light-adjusting liquid crystal layer; and
an ultraviolet light shielding layer, disposed at a side of the first base and located in the display area,
the second substrate comprises:
a second base; and
a second electrode layer, disposed at a side of the second base close to the light-adjusting liquid crystal layer,
wherein the ultraviolet light transmittance of the first electrode layer in the display area is greater than or equal to the predetermined threshold, and the ultraviolet light transmittance of the second electrode layer in the display area is greater than or equal to the predetermined threshold.

9. The display panel of claim 8, wherein the ultraviolet light shielding layer is disposed on a side of the first base away from the light-adjusting liquid crystal layer; or the ultraviolet light shielding layer is disposed between the first base and the first electrode layer; or the ultraviolet light shielding layer is disposed at a side of the first electrode layer away from the first base.

10. The display panel of claim 8, wherein a material of the first electrode layer comprises one or more types selected from indium tin oxide and indium oxide, and a material of the second electrode layer comprises one or more types selected from indium tin oxide and indium oxide.

11. A display device, comprising a display panel and a backlight module, in which the display panel comprises a display body and a light-adjusting liquid crystal cell disposed at a side of the display body, the backlight module is disposed at a side of the display body away from the light-adjusting liquid crystal cell, and the light-adjusting liquid crystal cell comprises a display area and a sealing area surrounding the display area, wherein the light-adjusting liquid crystal cell comprises:
a first substrate;
a second substrate, disposed opposite to the first substrate;
a light-adjusting liquid crystal layer, disposed between the first substrate and the second substrate and located in the display area, wherein the light-adjusting liquid crystal layer comprises a polymer network and liquid crystal molecules distributed in the polymer network, the liquid crystal molecules are of a nematic liquid crystal composition, and the nematic liquid crystal composition comprises any one of or a mixture of acrylates, methacrylates, styrene-based groups, or diacetyl groups; and
a sealing layer, disposed between the first substrate and the second substrate, and located in the sealing area,
wherein ultraviolet light transmittance of the first substrate in the display area is less than a predetermined threshold, and the ultraviolet light transmittance of the second substrate in the display area is greater than or equal to the predetermined threshold;
wherein the predetermined threshold is a smallest value of the ultraviolet light transmittance of either the first substrate or the second substrate in the display area that allows ultraviolet light to cause cross-linking reaction in the light-adjusting liquid crystal layer for forming the polymer network under irradiation of ultraviolet light; and
wherein the polymer network is arranged along a first direction, and the first direction is inclined with respect to a normal line of the first substrate.

12. The display device of claim 11, wherein the first substrate comprises:
a first base; and
a first electrode layer, disposed at a side of the first base close to the light-adjusting liquid crystal layer,
the second substrate comprises:
a second base; and
a second electrode layer, disposed at a side of the second base close to the light-adjusting liquid crystal layer,
wherein the ultraviolet light transmittance of the first electrode layer in the display area is less than the predetermined threshold, and the ultraviolet light transmittance of the second electrode layer in the display area is greater than or equal to the predetermined threshold.

13. The display device of claim 12, wherein an orthographic projection of the first electrode layer onto the first base has a first edge, an orthographic projection of the sealing layer onto the first base has a second edge close to a side of the display area, and the first edge and the second edge overlap with each other.

14. The display device of claim 12, wherein the predetermined threshold is greater than 10% and is less than or equal to 70%.

15. The display device of claim 14, wherein the ultraviolet light transmittance of the first electrode layer in the display area is less than or equal to 10%, and the ultraviolet light transmittance of the second electrode layer in the display area is greater than or equal to 70%.

16. The display device of claim 12, wherein visible light transmittance of the first electrode layer in the display area is greater than 80%, and the visible light transmittance of the second electrode layer in the display area is greater than 90%.

17. The display device of claim 11, wherein the first substrate comprises:
a first base;
a first electrode layer, disposed at a side of the first base close to the light-adjusting liquid crystal layer; and
an ultraviolet light shielding layer, disposed at a side of the first base and located in the display area,
the second substrate comprises:
a second base; and a second electrode layer, disposed at a side of the second base close to the light-adjusting liquid crystal layer, wherein the ultraviolet light transmittance of the first electrode layer in the display area is greater than or equal to the predetermined threshold, and the ultraviolet light transmittance of the second electrode layer in the display area is greater than or equal to the predetermined threshold.

18. The display device of claim 17, wherein the ultraviolet light shielding layer is disposed on a side of the first base away from the light-adjusting liquid crystal layer; or the ultraviolet light shielding layer is disposed between the first base and the first electrode layer; or the ultraviolet light shielding layer is disposed at a side of the first electrode layer away from the first base.

19. The display device of claim 17, wherein a material of the first electrode layer comprises one or more types selected from zinc oxide, aluminum-doped zinc oxide, zinc oxide/indium tin oxide, and indium tin oxide/zinc oxide/indium tin oxide, and a material of the second electrode layer comprises one or more types selected from indium tin oxide and indium oxide.

20. A method for manufacturing a display panel, comprising the steps of:

providing a first substrate and a second substrate, wherein a sealing layer is formed between the first substrate and the second substrate, and the sealing layer is located in a sealing area of a light-adjusting liquid crystal cell;

injecting a polymer liquid crystal mixture between the first substrate and the second substrate, wherein the polymer liquid crystal mixture is located in a display area of the light-adjusting liquid crystal cell;

providing an ultraviolet light mask which is located at a side of the first substrate away from the second substrate, and irradiating at the light-adjusting liquid crystal cell with ultraviolet light to cure the sealing layer, wherein a light shielding area of the ultraviolet light mask corresponds to the display area, and ultraviolet light transmittance of the first substrate in the display area is less than a predetermined threshold;

irradiating at the light-adjusting liquid crystal cell with the ultraviolet light from a side of the second substrate away from the first substrate to cure the polymer liquid crystal mixture to form a polymer network, wherein the ultraviolet light transmittance of the second substrate in the display area is greater than or equal to the predetermined threshold, wherein the predetermined threshold is a smallest value of the ultraviolet light transmittance of either the first substrate or the second substrate in the display area that allows ultraviolet light to cause cross-linking reaction in the light-adjusting liquid crystal layer for forming the polymer network under irradiation of ultraviolet light, wherein the polymer network is arranged along a first direction, and the first direction is inclined with respect to a normal line of the first substrate; and providing a display body, and assembling the display body with the light-adjusting liquid crystal cell to form the display panel.

\* \* \* \* \*